(12) United States Patent
Strauss et al.

(10) Patent No.: US 11,426,884 B2
(45) Date of Patent: Aug. 30, 2022

(54) REUSABLE MECHANICALLY FUSED DOVETAIL RETAINER MECHANISMS

(71) Applicant: X Development LLC, Mountain View, CA (US)

(72) Inventors: Marc Strauss, Fremont, CA (US); Colin Duffie, Mountain View, CA (US); Bin Su, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 113 days.

(21) Appl. No.: 16/984,576

(22) Filed: Aug. 4, 2020

(65) Prior Publication Data
US 2020/0361100 A1   Nov. 19, 2020

Related U.S. Application Data

(63) Continuation of application No. 15/843,714, filed on Dec. 15, 2017, now Pat. No. 10,759,063.

(51) Int. Cl.
*B25J 15/08* (2006.01)
*B25J 17/00* (2006.01)
*B25J 19/06* (2006.01)

(52) U.S. Cl.
CPC .............. *B25J 17/00* (2013.01); *B25J 15/08* (2013.01); *B25J 19/06* (2013.01)

(58) Field of Classification Search
CPC ... B23Q 1/28; B23Q 1/40; B23Q 1/58; B23Q 1/56; B23Q 1/42; B23Q 1/32; B23Q 1/26; B23Q 1/25; B25B 1/22; B25J 15/10; B25J 15/08; B25J 17/0241; B25J 17/00; B25J 19/063; B25J 19/06; B25J 15/12; B25J 15/0475; B25J 15/0408; B25J 15/04; F05D 2250/292; F05D 2250/291; F05D 2250/294; F16B 2/20; F16B 2/205; F16B 2/22; B23B 3/00; E04F 15/02038; E04F 15/02022; E04F 15/02005; E04F 15/02; B32B 7/08; B32B 7/06; B32B 3/266; B32B 3/06
USPC ...... 144/347; 52/590.1; 74/490.05; 428/172, 428/173; 248/548
See application file for complete search history.

(56) References Cited

U.S. PATENT DOCUMENTS

| | | |
|---|---|---|
| 2,002,442 A | 5/1935 | Swanson |
| 2,330,154 A | 9/1943 | Stabinski |
| 3,498,685 A | 3/1970 | Poplinski |
| 3,854,269 A | 12/1974 | Hancock |
| 3,903,573 A | 9/1975 | Wilson |
| 4,300,271 A | 11/1981 | Wohlhaupter |

(Continued)

FOREIGN PATENT DOCUMENTS

EP        0904891       3/1999
WO    WO-2010071648 A1 *  6/2010  .......... E04G 23/082

*Primary Examiner* — Jake Cook
*Assistant Examiner* — T. Scott Fix
(74) *Attorney, Agent, or Firm* — McDonnell Boehnen Hulbert & Berghoff LLP

(57) ABSTRACT

A reusable mechanism is disclosed for coupling two robotic appendages, such that an unintended force acting against a side of one of the appendages may decouple the appendages. The mechanism includes a revolved male dovetail mated to a revolved female dovetail. The mechanism may further include a channel within the male dovetail and a detent that inhibits rotation of the male dovetail in relation to the female dovetail.

14 Claims, 13 Drawing Sheets

(56) References Cited

U.S. PATENT DOCUMENTS

| | | | |
|---|---|---|---|
| 4,482,289 A | 11/1984 | Inaba et al. | |
| 4,725,190 A * | 2/1988 | Kato | B25J 19/063 |
| | | | 414/730 |
| 4,893,802 A | 1/1990 | Lin | |
| 4,911,574 A | 3/1990 | VanderPol et al. | |
| 5,551,795 A | 9/1996 | Engibarov | |
| 5,697,257 A | 12/1997 | Oh | |
| 6,176,641 B1 * | 1/2001 | Schenk | F16M 11/041 |
| | | | 403/374.5 |
| 6,898,903 B1 | 5/2005 | Thomas | |
| 7,614,189 B2 | 11/2009 | Smerud et al. | |
| 8,511,661 B2 | 8/2013 | Huang | |
| 10,279,484 B2 | 5/2019 | Birglen | |
| 2003/0020226 A1 | 1/2003 | Kick | |
| 2003/0082986 A1 | 5/2003 | Wiens et al. | |
| 2003/0175075 A1 | 9/2003 | Garrison | |
| 2005/0103147 A1 * | 5/2005 | Lee | B25J 19/0091 |
| | | | 74/490.01 |
| 2013/0328967 A1 | 12/2013 | Miyazawa | |
| 2014/0035306 A1 * | 2/2014 | Garcia | B25J 15/08 |
| | | | 294/213 |
| 2014/0132020 A1 * | 5/2014 | Claffee | B25J 15/10 |
| | | | 901/31 |
| 2016/0108744 A1 | 4/2016 | Locatelli et al. | |
| 2018/0056528 A1 * | 3/2018 | Cochran | B25J 15/02 |

\* cited by examiner

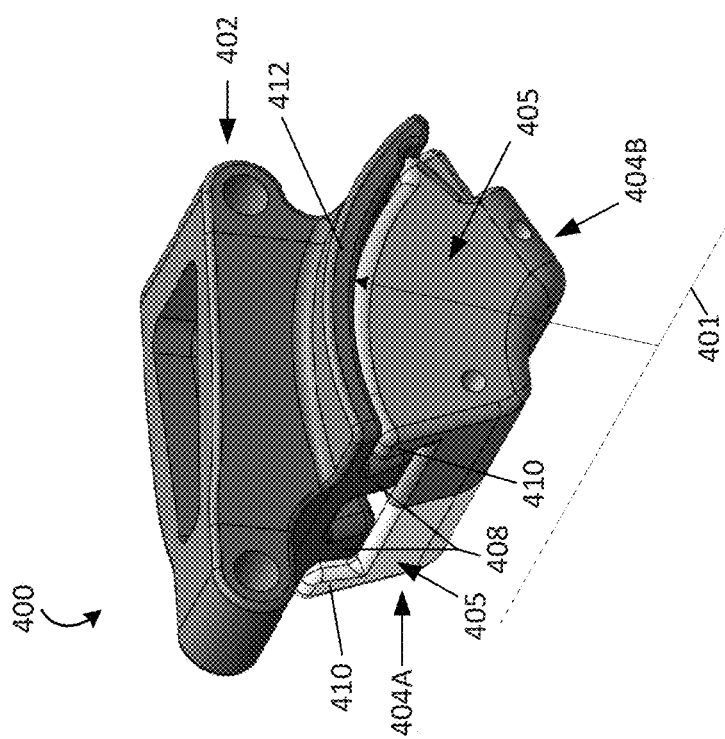
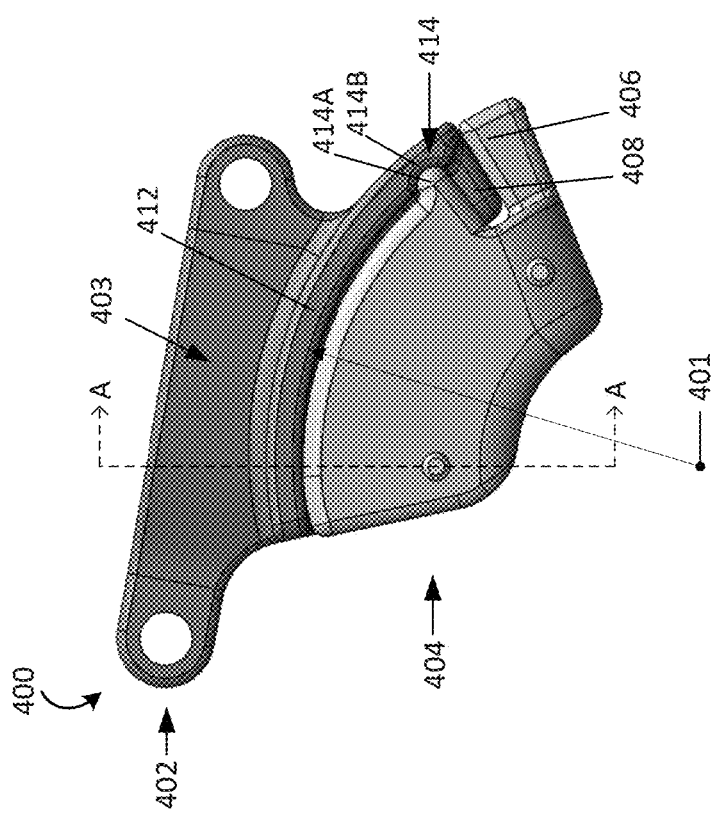

SECTION A-A (IN PERSPECTIVE)

SECTION A-A

REUSABLE MECHANICALLY FUSED DOVETAIL RETAINER MECHANISMS

CROSS-REFERENCE TO RELATED APPLICATIONS

This present application claims priority to U.S. patent application Ser. No. 15/843,714 filed on Dec. 15, 2017, the entire contents of which are herein incorporated by reference.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), enveloping, ingressive (such as a pin or needle), astrictive (such as a vacuum or suction element) or contigutive (requiring contact for adhesion, such as glue).

SUMMARY

The present application discloses implementations of a system and mechanism for coupling two robotic appendages (e.g., a finger and an actuator base), such that an unintended force acting against a side of one of the appendages decouples the appendages. Further, the mechanism is not damaged or destroyed during the decoupling and the appendages may be re-coupled together via the mechanism. In practical effect, the mechanism acts as a mechanical fuse between the appendages.

In one example, the present application describes a retainer mechanism that includes a first member and a second member. The first member may include a first body and a male dovetail extending outward from the first body. The male dovetail may include two outer surfaces inclined relative to each other and the male dovetail may be arranged in an arc about a central axis. The second member may include a second body and a female dovetail extending outward from the second body. The female dovetail may include two inner surfaces inclined relative to each other that define a first channel between the two inner surfaces. The female dovetail may be arranged in an arc about the central axis and be configured to couple with the male dovetail, such that each of the two outer surfaces of the male dovetail mates with one of the respective inner surface of the female dovetail.

In another example, the present application describes a robotic system that includes a retainer mechanism, a first robotic appendage, and a second robotic appendage. The retainer mechanism includes a first member and a second member. The first member may include a male dovetail structure arranged in an arc about a central axis, and the second member may include a female dovetail structure arranged in an arc about the central axis. The first member may be coupled to the second member via the male and female dovetail structures. The first robotic appendage may be fixedly coupled to either the first or second member of the retainer. The second robotic appendage may be fixedly coupled to the member not fixedly coupled to the first robotic appendage. The retainer mechanism may be configured to allow the first member to decouple from the second member via the male and female dovetail structures when a force applied to a side of the first robotic appendage is more than a threshold force.

In another example, the present application describes a retainer mechanism that includes a first member, a second member, and a detent. The first member may include a first body and a male dovetail extending outward from the first body. The male dovetail may include two outer surfaces inclined relative to each other with an inner channel located between the two outer surfaces. The male dovetail may be arranged in an arc about a central axis. The second member may include a second body and a female dovetail extending outward from the second body. The female dovetail may include two inner surfaces inclined relative to each other that define a first channel between the two inner surfaces. The female dovetail may be arranged in an arc about the central axis and be configured to couple with the male dovetail, such that each of the two outer surfaces of the male dovetail mates with one of the respective inner surface of the female dovetail. The detent may be configured to inhibit rotational movement of the first body relative to the second body about the central axis.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIGS. 4A and 4B illustrate side and perspective views, respectively, of an example retainer mechanism, according to an example implementation.

DETAILED DESCRIPTION

Figure 1:
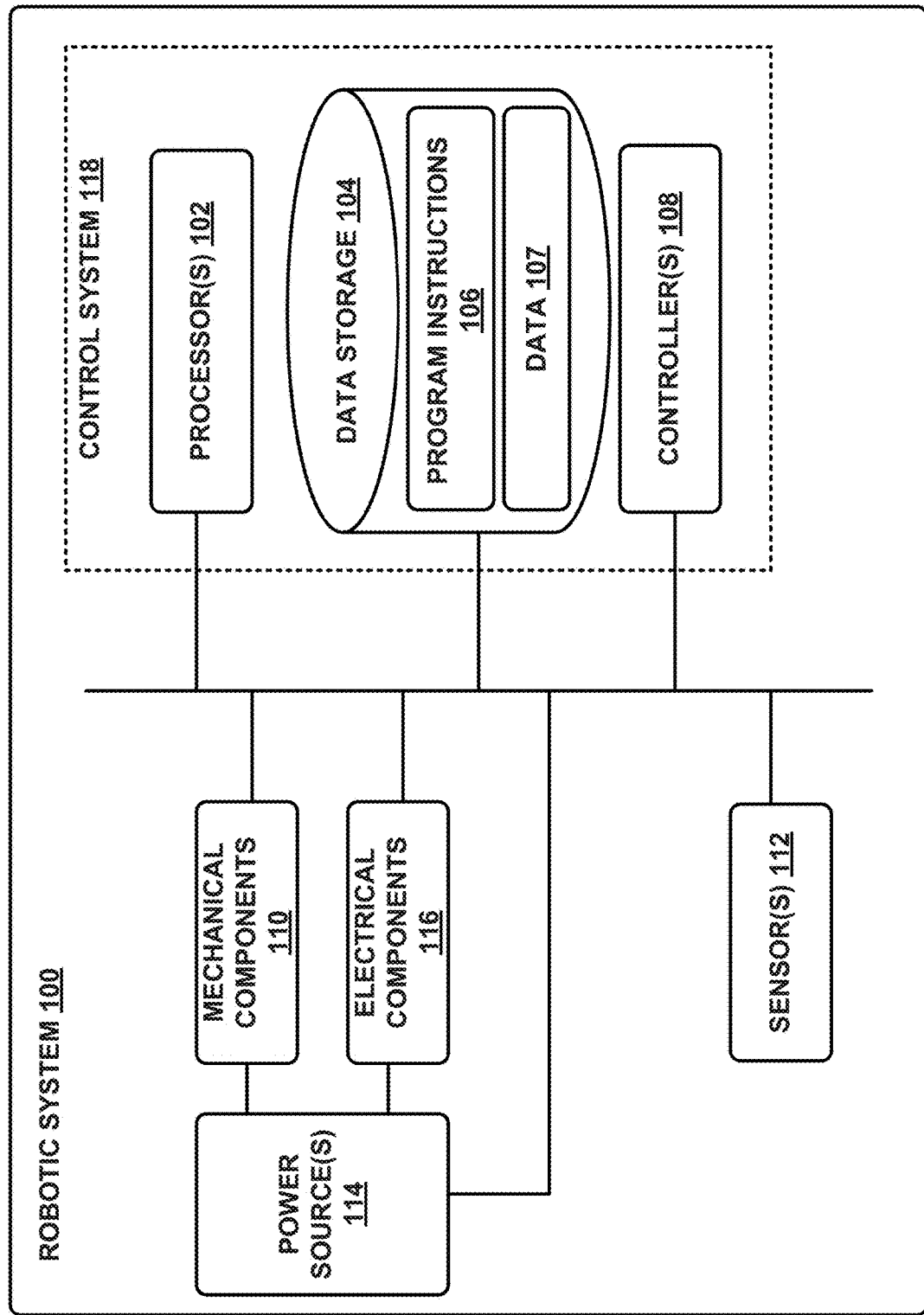
FIG. 1 illustrates a configuration of a robotic system, according to an example implementation.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. OVERVIEW

As explained above, various types of robotic devices are being created for performing a variety of tasks that may assist users. For example, a robotic device may interact with objects while performing an assigned task. The tools that a robotic device may use to interact with objects are defined as end-of-arm tooling (EOAT). In particular, the robotic device may include a tool or an "end effector." In an example, an end effector may be a gripper which includes fingers that may be used to grasp and manipulate objects.

Generally, fingers are attached to actuators in an end effector, so as to allow the fingers to perform opening and/or gripping operations. Preferably, the fingers are securely coupled to the actuators via a retainer mechanism; however, a crash or other unintended outside force acting on a rigidly coupled retainer mechanism can be problematic. In the case of a side force acting on a finger (e.g., a force acting at an orthogonal or oblique angle to the normal movement direction of the finger during operation), the finger, actuator, end effector, or a coupling mechanism between the finger and actuator, may be damaged. The same damage may also occur in a retainer mechanism coupling other robotic appendages together when an unintended side force acts on one of the appendages. Therefore, it is beneficial to have a retainer mechanism that securely couples two appendages (e.g., a finger and an actuator), but allows for decoupling in the event of an unintended side force that is above a threshold that would otherwise damage a component.

Disclosed herein are retainer mechanisms with mating revolved dovetails that can be tuned to decouple when subject to a force or moment, particularly a side force or moment, above a threshold value. The mating dovetails may be coupled to each other by sliding the revolved male dovetail into the revolved female dovetail along an arc. Further, a backstop may positively locate one dovetail at the end of its movement along the arc and a detent may inhibit movement of one dovetail relative to the other along the arc during normal operation. The retainer mechanism allows for easy interchangeability of appendages (including fingers) while acting as a reusable mechanical fuse that prevents damage to an appendage from unintended side forces.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a robotic arm, industrial robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

In an example, the data storage 104 may be a remote server (e.g., cloud server) in which the robotic device 100 may store data 107. The robotic device may also retrieve the data 107 from the remote server. The server may include one or more servers, such as one or more of a communications server, an application server, a file server, a database server, and a web server. A server may be referred to as a "computer server." The data transfer between the robotic device 100 and the cloud server may be arranged according to a file transfer protocol (FTP), or according to another protocol.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), finger(s), feet, preshaper components, and/or end effectors. The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. In other implementations, the robotic system 100 may include one or more detachable fingers. Other types of removable components may be included within some implementations.

The robotic system 100 may include sensor(s) 112 arranged to sense aspects of the robotic system 100. The sensor(s) 112 may include one or more force sensors, force/torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. In another example, sensor(s) 112 may capture data corresponding to one or more characteristics of a target or identified object, such as a size, shape, profile, structure, or orientation of the object.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or finger to measure the load on the actuators that move one or more members of the arm, leg, hand, foot, or finger. As another example, the robotic system 100 may use one or more position sensors to sense the position of the actuators of the robotic system. For instance, such position sensors may sense states of extension, retraction, positioning, or rotation of the actuators on arms, legs, hands, feet, fingers, preshaper components, or end effectors.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems (e.g., internal combustion engines, fuel cells, hamster wheels, etc.). As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, end effectors, gripping devices and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of the robotic system 100 are described below.

Figure 2:
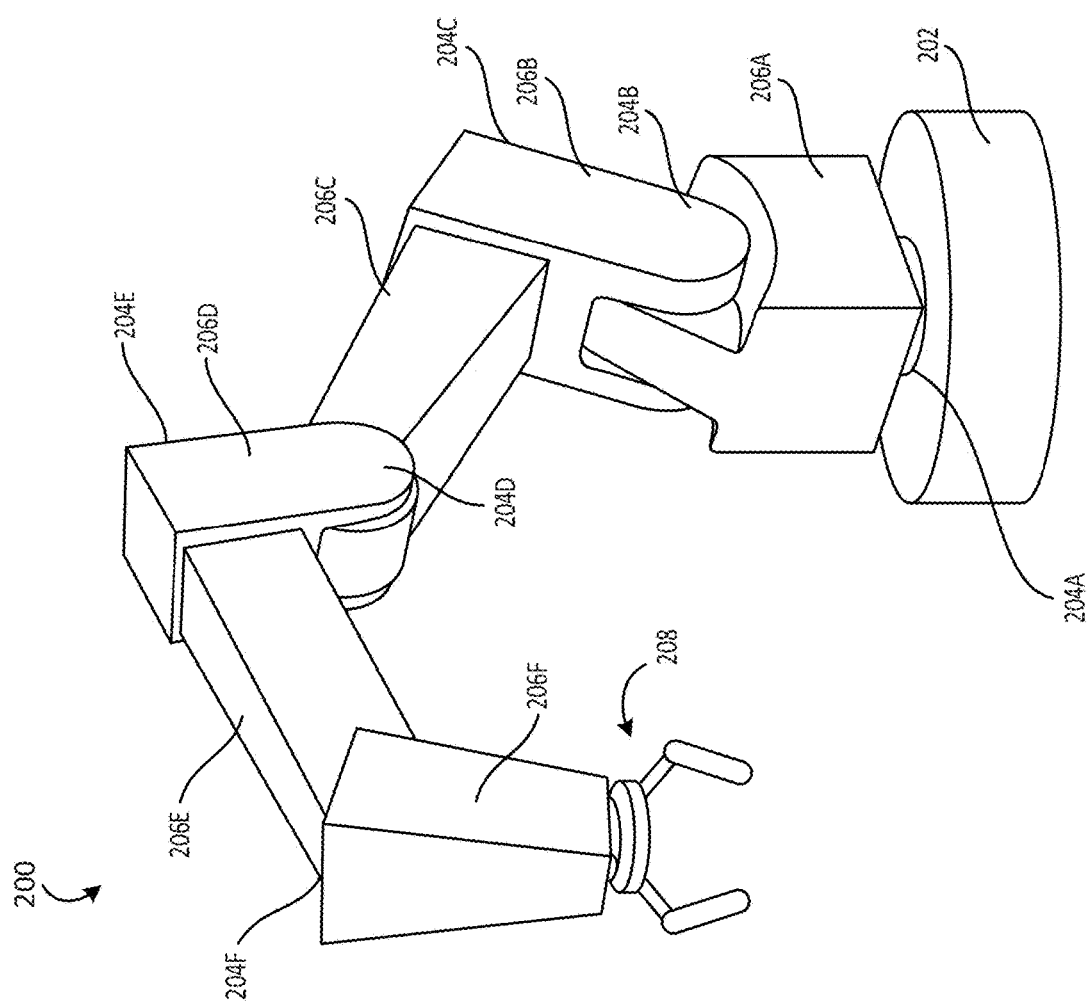
FIG. 2 illustrates an example robotic arm system, according to an example implementation.

FIG. 2 shows an example robotic arm 200. As shown, the robotic arm 200 includes a base 202, which may be a stationary base or may be a movable base. In the case of a movable base, the base 202 may be considered as one of the mechanical components 110 and may include wheels (not shown), powered by one or more of actuators, which allow for mobility of the entire robotic arm 200.

Additionally, the robotic arm 200 includes joints 204A-204F each coupled to one or more actuators. The actuators in joints 204A-204F may operate to cause movement of various mechanical components 110 such as appendages 206A-206F and/or end effector 208 (which may be considered one or more appendages). For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Note that the end effector 208 may be a detachable end effector such that the robotic arm 200 may swap out the end effector 208 with a different end effector. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the mechanical components 110, joint position data, velocity data, acceleration data, force/torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

III. EXAMPLE REUSABLE MECHANICALLY FUSED DOVETAIL RETAINER MECHANISMS

As noted above, the present disclosure includes implementations that relate to a retainer mechanism. The retainer mechanism may be used in a robotic device and/or system to allow easy appendage and finger changes, while protecting against catastrophic damage to the robotic device due to unintended impacts or loads.

Figure 3:
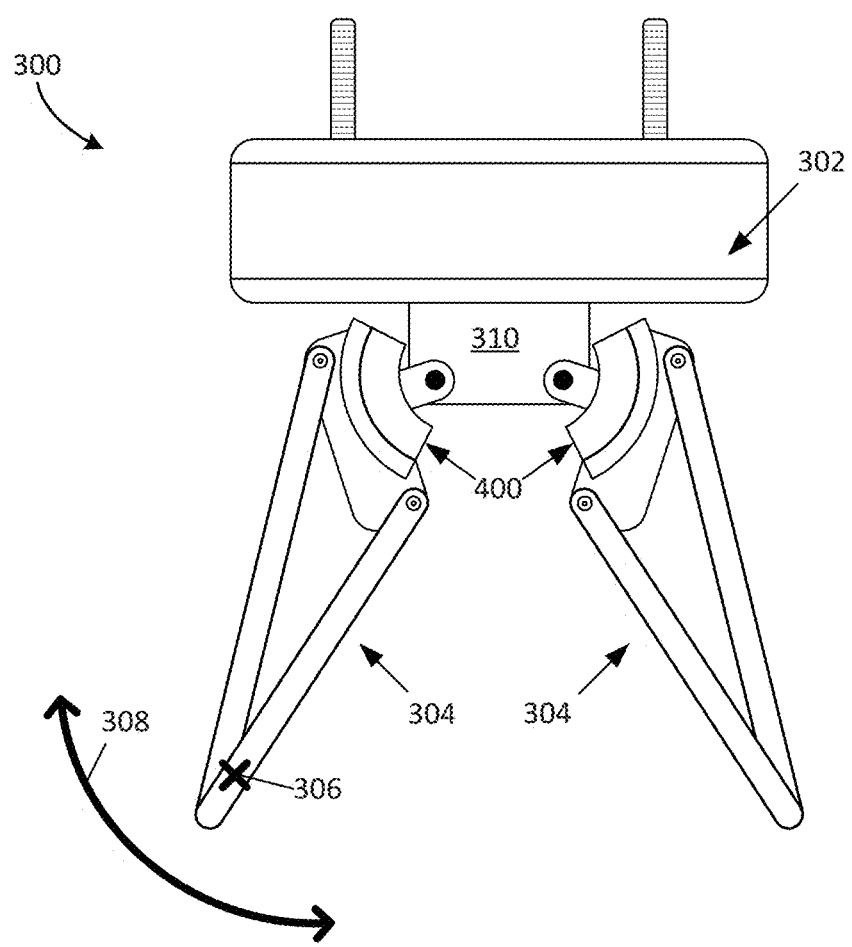
FIG. 3 illustrates an example gripper, according to an example embodiment.
Figure 4C:
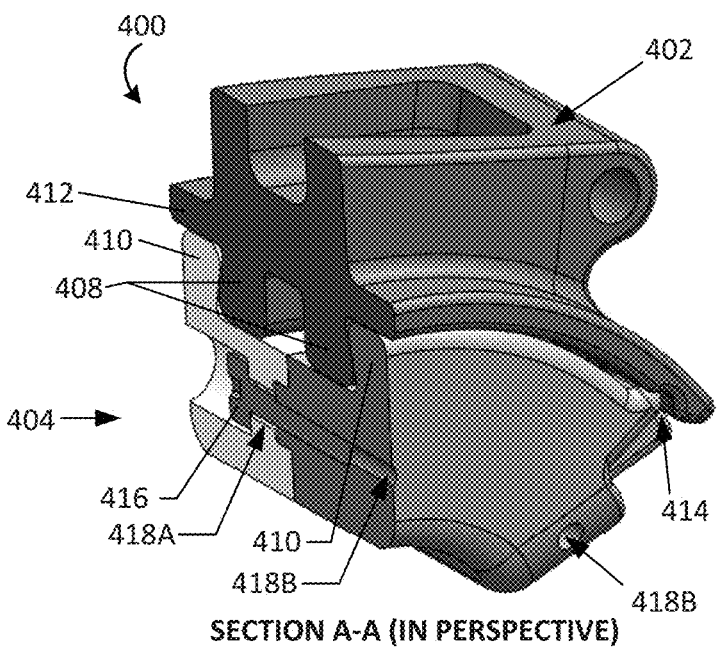
FIGS. 4C and 4D illustrate perspective and side section views, respectively, of an example retainer mechanism, according to an example implementation
Figure 4D:
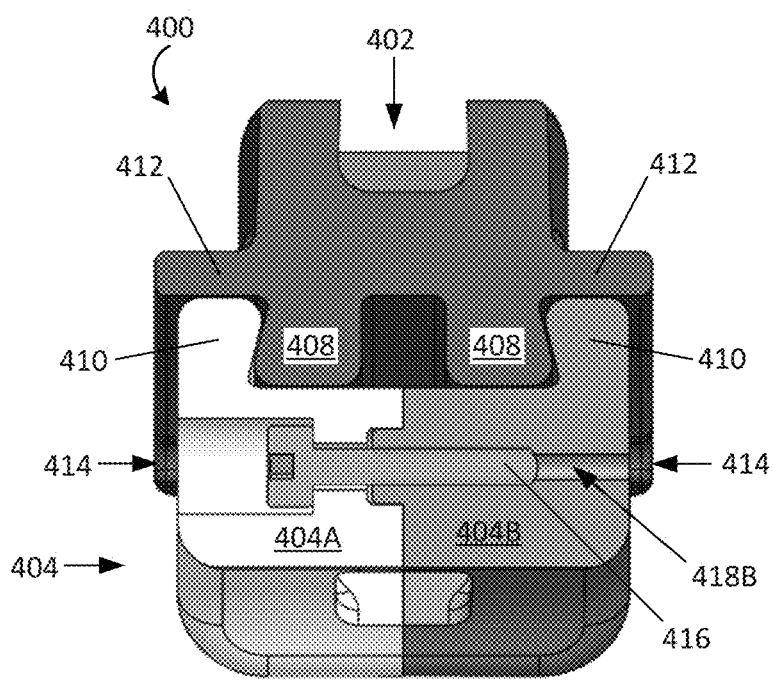
Figure 4G:
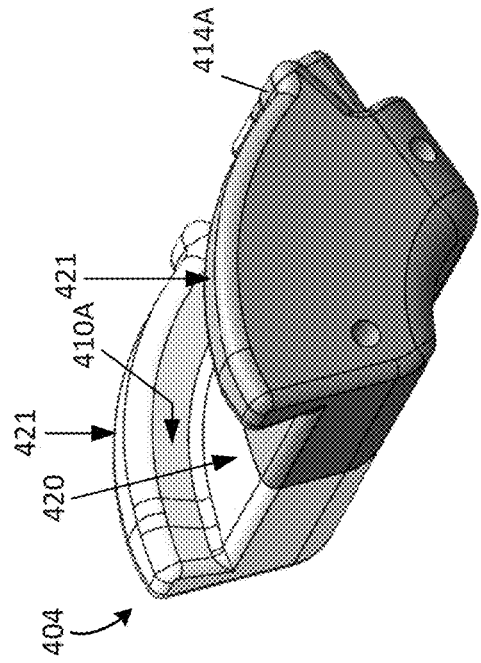
FIGS. 4E-G illustrate top, front, and perspective views, respectively, of retainer mechanism components, according to an example implementation.
Figure 4E:
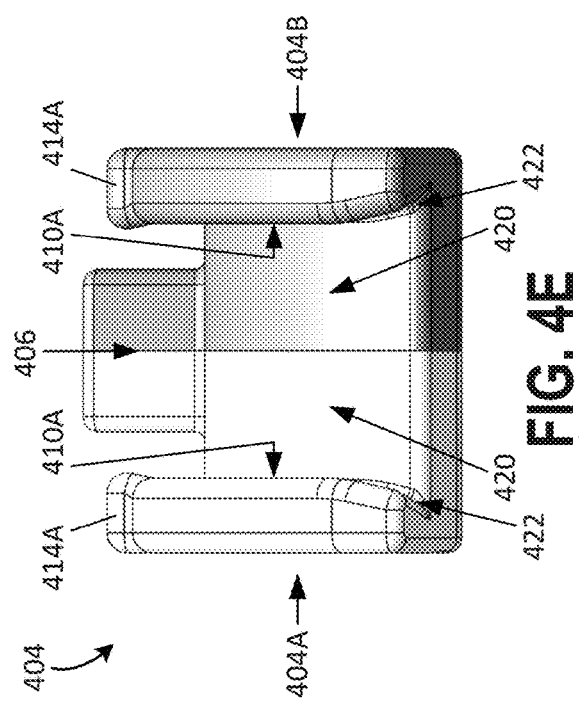
Figure 4F:
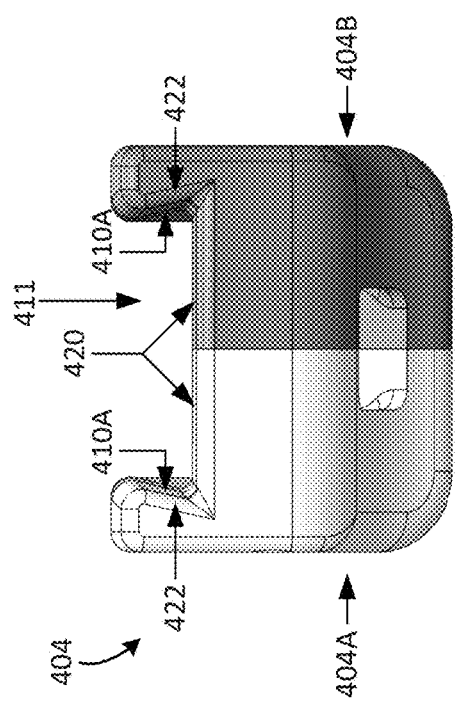
Figure 4I:
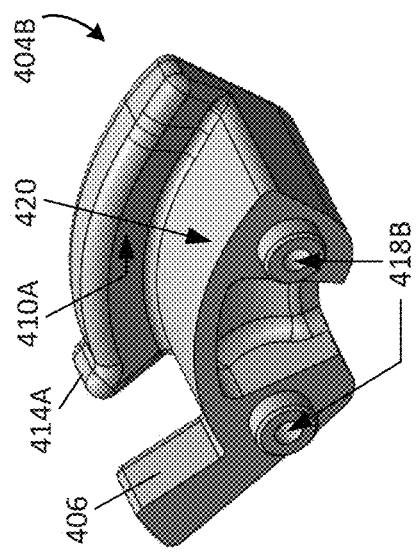
FIGS. 4H and 4I illustrate perspective views of retainer mechanism components, according to an example implementation.
Figure 4H:
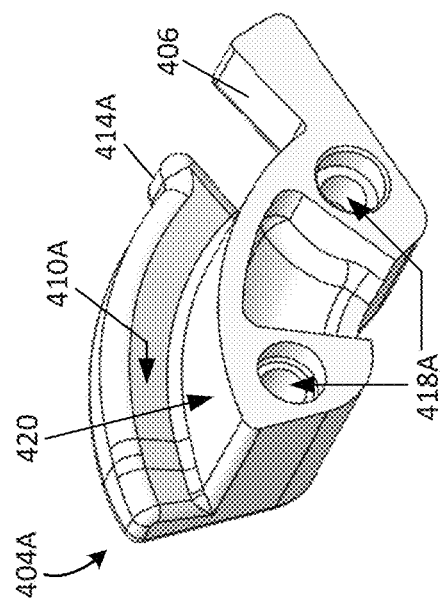
Figure 4K:
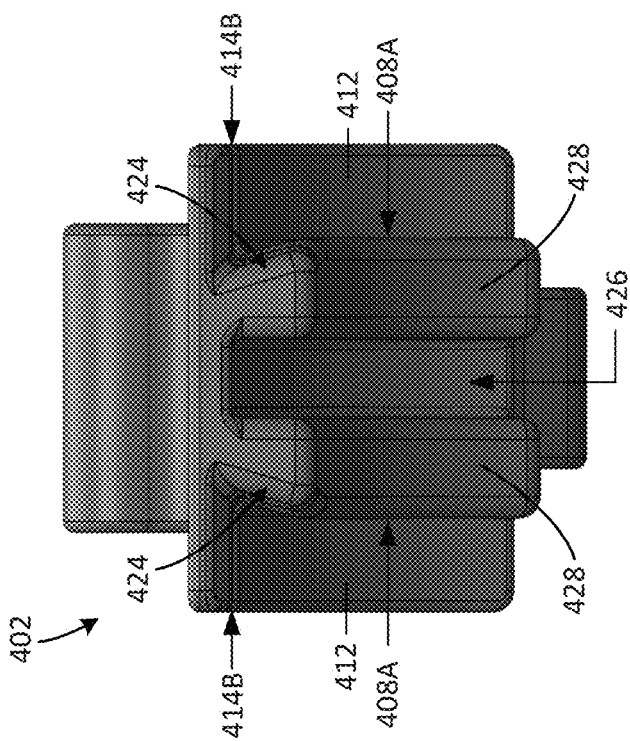
FIGS. 4J and 4K illustrate perspective views and bottom views, respectively, of a retainer mechanism component, according to an example implementation.
Figure 4J:
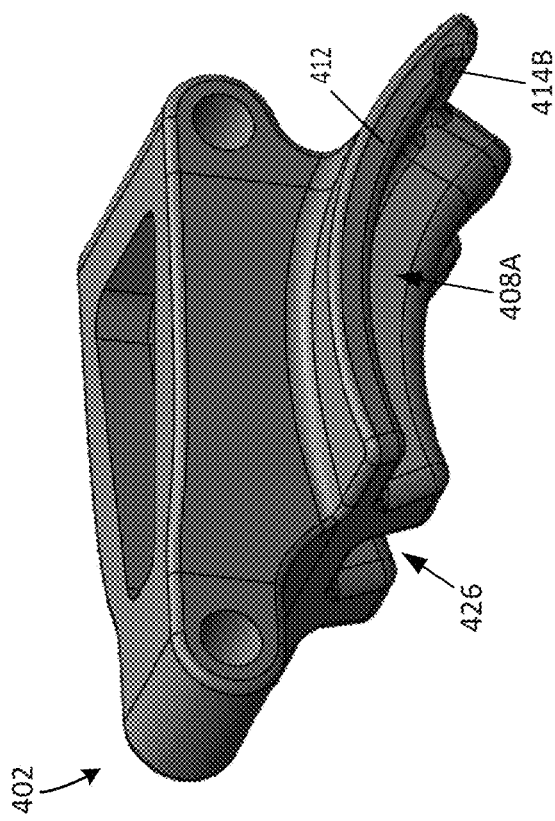

FIG. 3 illustrates an example gripper 300, according to an example embodiment. Gripper 300 may be deployed in place of end effector 208 in robotic arm 200 and/or as one of the mechanical components 110 in robotic system 100. Gripper 300 includes two opposable fingers 304, though more or fewer fingers are contemplated.

Gripper 300 includes an actuator base 302, according to an exemplary embodiment. A retainer mechanism 400 may be used to attach each of one or more fingers 304 to one or more actuators 310 in the actuator base 302. For purposes of illustration, a normal rotational (or translational) movement of a finger 304 is shown by arrow 308. Additionally, a side force 306 is represented acting against the finger 304 orthogonally to the normal movement 308 (i.e., into the Figure). The side force 306 may be a component of a force acting on the finger obliquely to the normal movement 308.

FIG. 4A-K illustrate an example retainer mechanism 400 and its components, according to an exemplary embodiment. Although the components illustrated in FIGS. 4A-K are shown with certain design features and/or orientations, it should be understood that one or more features may be removed, added, and/or modified while remaining within the scope of this disclosure. Also, the orientation and combination of features may be changed based on the desired implementation.

Retainer mechanism 400 includes a first member 402 and a second member 404. Each member 402 and 404 may be fixedly connected to a respective appendage. For example, in a preferred arrangement, first member 402 may be connected to a finger, such as finger 304 and second member 404 may be connected to an actuator, such as an actuator in actuator base 302. Alternatively, in another arrangement, first member 402 may be connected to an actuator, such as an actuator in actuator base 302 and second member 404 may be connected to a finger, such as finger 304. Alternatively, retainer mechanism 400 may be connected between other appendages, such as at joints 204A-F in system 200.

First member 402 includes a body 403 with a male dovetail 408 extending downward from the body. The length of male dovetail 408 along its outer surfaces 408A is not linear, but rather is revolved about a central axis 401 and takes the form of an arc. The male dovetail 408 further includes an inner channel 426 between the outer surfaces 408. The inner channel 426 permits greater deflection of the outer surfaces 408A in response to a side-loading force than if the male dovetail 408 was entirely solid between the outer surfaces 408A.

First member 402 further includes a pair of wings 412 that extend outward from the body 403. As illustrated in this example embodiment, the each wing 412 is adjacent to a corresponding outer surface 408A of the male dovetail 408. Each wing 412 may extend orthogonally from the body and at an acute angle relative to its respective male dovetail outer surface 408A. However, in another implementation, each wing 412 may be at an orthogonal or obtuse angle to its respective outer surface 408A.

As illustrated in this example, second member 404 includes two halves 404A and 404B, though in another embodiment, second member 404 may be unitary. Constructing second member 404 out of halves 404A and 404B provides benefits in the manufacture of the second member 404, including easier mold release, machining, or 3D printing, depending on the method(s) of manufacture. In the illustrated example, halves 404A and 404B are secured together with fasteners 416 through thru-holes 418A and 418B. The fasteners 416 may be, for example, screws, bolts, or rivets. Alternatively, the halves 404A and 404B may be fastened together by other means, including, for example, adhesives, plastic welding methods, and/or latch geometries.

Second member 404 includes a female dovetail 410 extending upward from a body 405. Similar to male dovetail 408, the length of female dovetail 410 along its inner surfaces 410A is not linear, but rather is revolved about the central axis 401 and takes the form of an arc. The inner surfaces 410A define two sides of a channel 411 between inner surfaces 410A, with a third side of the channel 411 defined by a base surface 420. The base surface 420 is similarly revolved about the central axis 401 and takes the form of an arc.

Figure 5A:
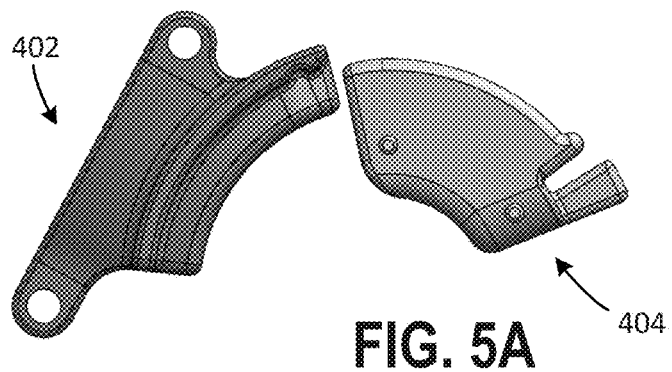
FIGS. 5A-C illustrate a step-wise coupling of a retainer mechanism, according to an example implementation.
Figure 5B:
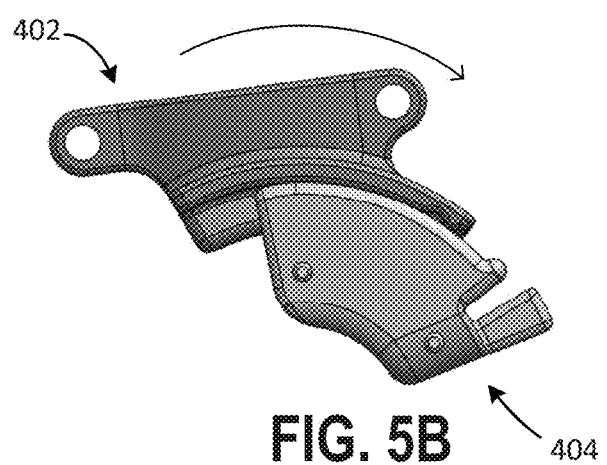
Figure 5C:
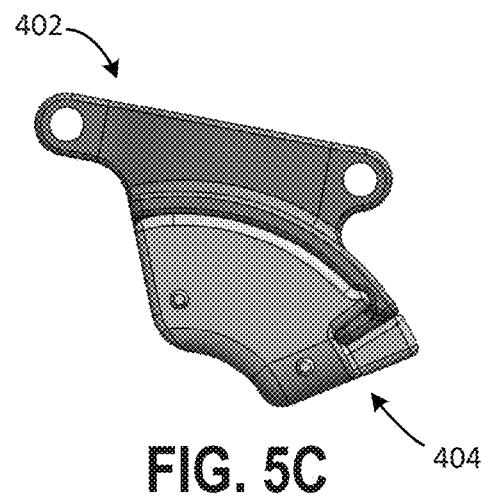

First member 402 may be slidably engaged with second member 404, as depicted in stepwise manner in FIGS. 5A-5C. An end of male dovetail 408 of first member 402 may be inserted into an end of female dovetail 410 of second member 404. Then, first member 402 may be slid further into second member 404 in a rotational manner along an arc about central axis 401 (central axis 401 is illustrated in FIGS. 4A and 4B). The first member 402 may slide into second member 404 until it hits a backstop and/or detent.

Referring back to FIGS. 4A-K, second member 404 includes a backstop 406, which extends outward from the second body 405. As the first member 402 is inserted into the second member 404, the backstop 406 eventually makes contact with an end of the male dovetail 408 and prevents rotational movement of the first member 402 relative to the second member 404 about the central axis 401 beyond the backstop 406.

The female dovetail 410 includes a top surface 421 adjacent to each corresponding inner surface 410A. Each top surface 421 may extend at an acute, orthogonal, or obtuse angle relative to its respective female dovetail inner surface 418A. Preferably, each top surface 421 is oriented concentric to a corresponding wing 412, such that, when the second member 404 is coupled to with the first member 402, each top surface 421 has a mating interface with the corresponding wing 412.

Similarly, the male dovetail 408 includes two bottom surfaces 428, each adjacent to a corresponding outer surface 408A. Each bottom surface 428 may extend at an acute, orthogonal, or obtuse angle relative to its respective outer surface 418A. Preferably, each bottom surface 428 is oriented concentric to the base surface 420, such that, when the second member 404 is coupled with the first member 402, each bottom surface 428 has a mating interface with the base surface 420.

Figure 12:
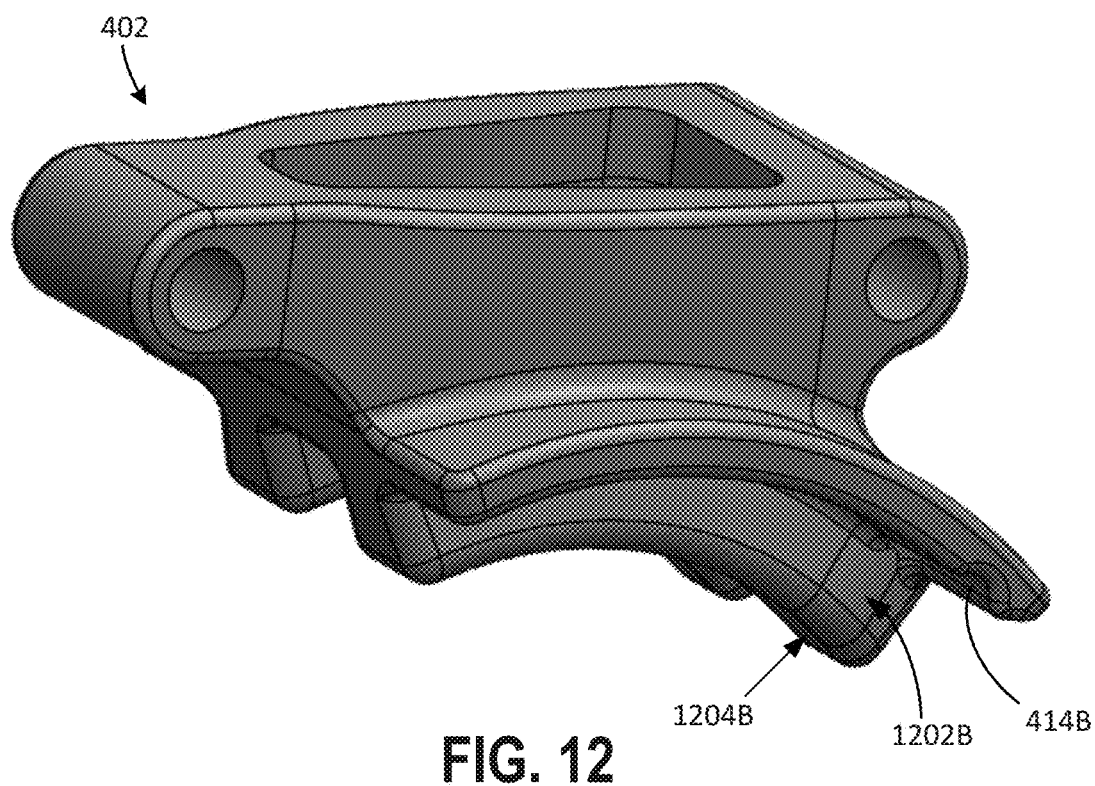
FIGS. 12 and 13 illustrate alternative detent locations, according to example implementations.
Figure 13:
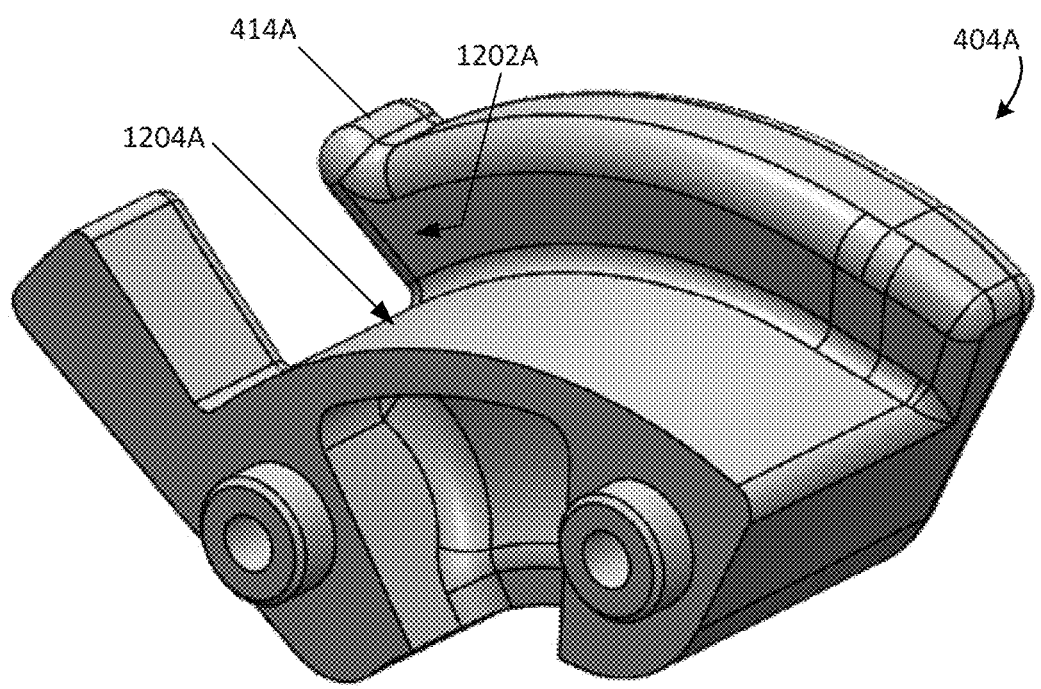

One or more detents may be included at any of these mating surfaces to inhibit rotational movement of first member 402 relative to second member 404. The detent can prevent the first member 402 from sliding back out of the second member 404 by providing a securing force that inhibits relative movement about the central axis 401. As shown in the example embodiment in FIGS. 4A-K, a detent 414 is located near an end of the female dovetail 410 and an end of the wings 412. Each wing 412 includes a recess 414B of the detent 414 that is configured to mate with a protrusion 414A of the detent 414 on the top surfaces 410A. When the first member 402 is slid into the second member 404 and up against the backstop 406, the protrusion 414A "clicks" into the recess 414B and prevents the first member 402 from sliding back out of the second member 404, unless sufficient force is applied to "unclick" the detent 414. As illustrated, the recess 414B is a groove and the protrusion 414A is a linear protrusion. However, other embodiments are possible, such as a hemispherical or conical recess and protrusion. Other detent designs may provide even greater securing power, such as a square recess and protrusion, or a French cleat design, and are also contemplated herein. Further, the protrusion and recess locations may be reversed. For example a wing 412 may have a protrusion and a top surface 410A may have a recess. And in other embodiments, one or more detents may be located additionally or alternatively at other locations. FIGS. 12 and 13 illustrate some alternative locations for a recess/protrusion detent similar to detent 414. For example, a detent may be provided at the mating interface between the base surface 420 and the bottom surface(s) 428 at the locations 1204A and 1204B, respectively. In another example, a detent may be provided at the mating interface between the female dovetail inner surface(s) 410A and the male dovetail outer surface(s) 408A at the locations 1202A and 1202B, respectively. It should be noted that a detent on the dovetail outer and inner surface(s) 408A and 410A may affect the decoupling force of the retainer mechanism embodiments disclosed herein.

Returning to other features of retainer mechanism 400, FIGS. 4A-K further illustrate that the male dovetail 408 further includes a lead-in feature 424, here depicted as a tapered transition between an outer surface 408A and an end of the male dovetail 408. Similarly female dovetail 418 also includes a lead-in feature 422, here depicted as a tapered transition between an inner surface 408A and an end of the female dovetail 410. The lead-in features 422 and 424 permit easier location of the first member 402 to the second member 404 when they are initially slidably engaged, such as in FIGS. 5A to 5B.

Figure 6:
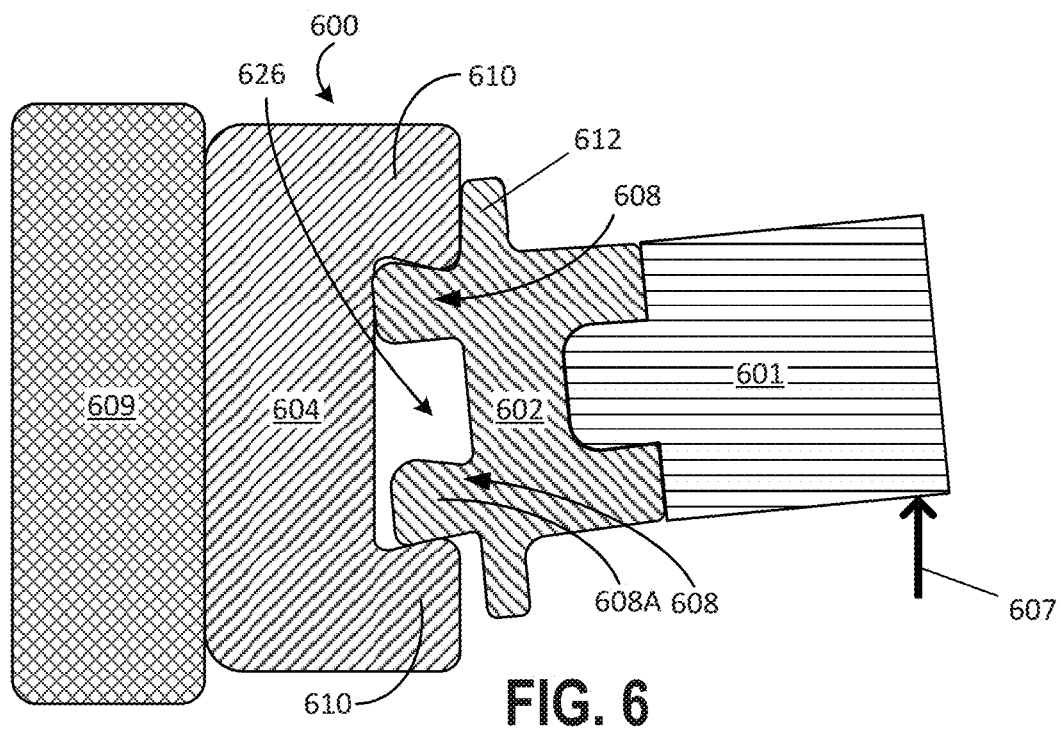
FIG. 6 illustrates a retainer mechanism during side-force decoupling, according to an example implementation.

FIG. 6 illustrates a retainer mechanism during side-force decoupling, and illustrates an application of its use. In an embodiment with a finger and an actuator, a finger 601 may be coupled to an actuator 609 via the retainer mechanism 600. Retainer mechanism 600 may be the same as, or similar to, retainer mechanism 400, and includes a finger mount 602 and an actuator mount 604, which may correspond to first member 402 and second member 404, respectively. In an alternative embodiment, finger mount 602 could instead take the form of second member 404 (i.e., a female revolved dovetail) and actuator mount 604 could instead take the form of first member 402 (i.e., a male revolved dovetail)

In the illustrated example, when a side force 607 is applied to the finger 601, the retainer 600 is able to decouple instead of breaking. One of the wings 612 may elastically deform to allow rotation of finger mount 602 relative to the actuator mount 604 in the direction of the side force 607. The male dovetail 608, which kept the finger mount 602 securely coupled to the actuator mount 604 via the female dovetail, begins to controllably decouple. In this example, the root widths (described below with respect to FIG. 7) of female dovetail 610 are significantly wider than the root widths of male dovetail 608. Assuming female dovetail 610 and male dovetail 608 are constructed of similar materials, male dovetail portion 608A will elastically deform and bend into the inner channel 626, allowing the male dovetail 608 to pop out of the female dovetail 610. In other embodiments, where female dovetail 610 is made of a softer material or has a narrower root width than male dovetail 608, a portion of the female dovetail 610 may elastically deform and allow a similar decoupling action. In another embodiment, where the materials are similar and the root widths are similar, one or more portions of both male dovetail 608 and female dovetail 610 may elastically deform to allow the decoupling. Because the dovetails 608 and/or 610 elastically deformed, they will return substantially or completely to their original shape and may be reused and recoupled with each other, such as in the illustration in FIGS. 5A-C.

Figure 7:
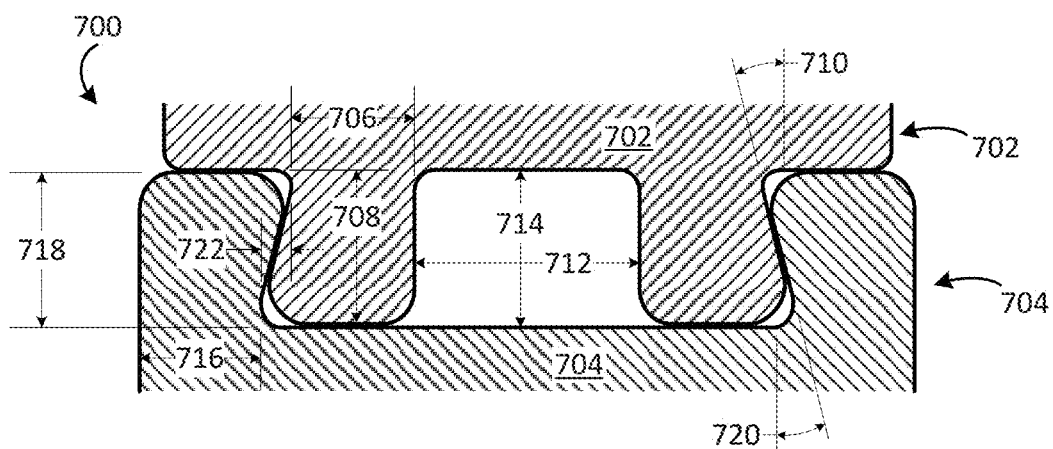
FIG. 7 illustrates reference dimensions of a retainer mechanism, according to an example implementation.

FIG. 7 illustrates reference dimensions of a retainer mechanism 700, according to an example implementation. Retainer mechanism 700 may be the same as, or similar to, retainer mechanisms 400 and/or 600, or other embodiments disclosed herein. FIG. 7 illustrates portions of a first member 702 and a second member 704, whose features, such as male and female dovetails and inner channels, correspond to similar features described in other embodiments disclosed herein.

The male dovetail of first member 702 can be defined in part by a male root width 706, a male dovetail height 708, and a male dovetail angle 710 which is measured from an imaginary vertical plane, as is common practice. The female dovetail of second member 704 can be defined in part by a female root width 716, a female dovetail height 718, and a female dovetail angle 720 which is also measured from an imaginary vertical plane. At the mating interface between an outer surface of the male dovetail and the inner surface of a female dovetail, the dovetails will overlap by the overlap width 722, as measured from the location of the respective root widths. The male dovetail inner channel may be defined in part by channel width 712 and channel height 714.

To tune the "fuse-out" force (i.e., a side-load force sufficient to cause decoupling) and deformation characteristics associated with decoupling a retainer mechanism, the root widths 706 and 716, overlap 722, root heights 708 and 718, angles 710 and 720, and inner channel width and height 712 and 714 can be modified to achieve a desired balance of fuse-out force, elastic versus plastic deformation, and retention force in directions essential to normal operations of an appendage (e.g. a finger). In a preferred embodiment, angles 710 and 720 are substantially identical, but they may be different in alternative embodiments. Also in preferred embodiments, the root width 706 is substantially the same as the root width 716.

Figure 8:
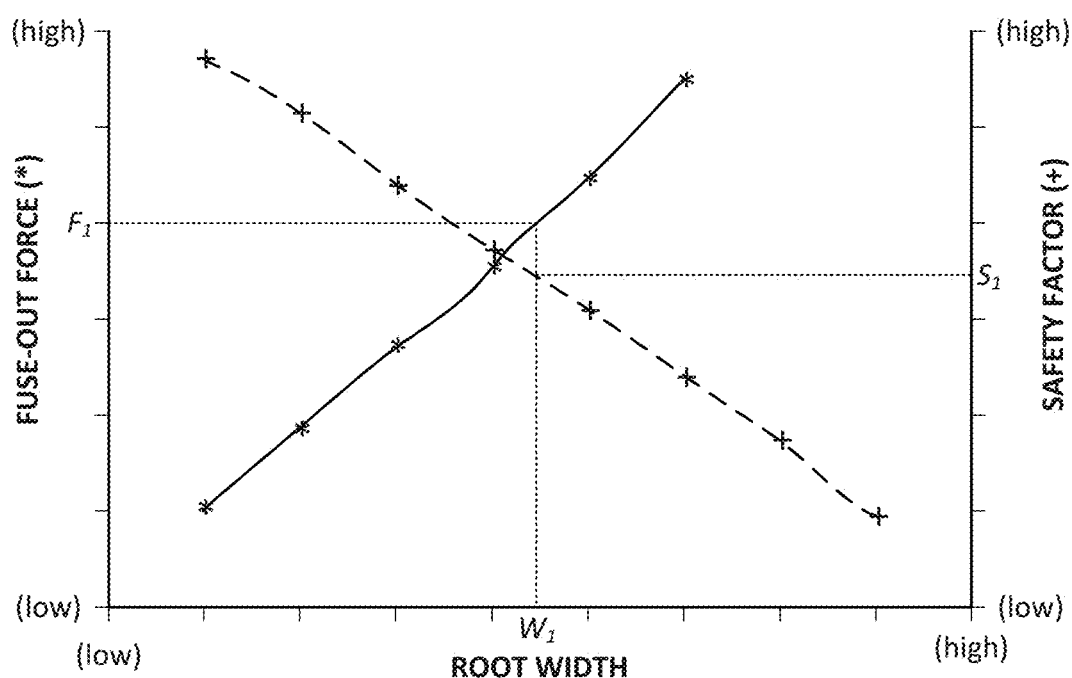
FIG. 8 is a chart illustrating Root Width versus Fuse-out Force and Safety Factor, according to an example implementation.

FIG. 8 is a chart illustrating root width versus fuse-out force and safety factor, according to an example implementation. Empirical data developed from modeling and testing embodiments of the retention mechanisms disclosed herein show that, given a constant overlap width, fuse-out force increases as a given root width widens, as illustrated by the dashed line in FIG. 8. The empirical data shows the same correlation whether the male root width (e.g., root width 706) or the female root width (e.g., root width 716) is considered. Therefore, if a given overlap and fuse-out force is desired, then a root width can be determined. Similarly, if design constraints dictate a given root width and overlap, then fuse-out force can be calculated.

Similarly obtained empirical data also show that the safety factor decreases as a given root width increases. Safety factor is the yield stress of the material divided by the stress level at the maximum stress location/condition. It is preferred to have the largest safety factor possible; however, increasing the safety factor beyond a certain point generally adds detrimental weight and/or size. The preferred safety factor value is greater than 1, with some additional margin for system variances.

Tests and modeling were performed on a retention mechanism 400 made of Nylon 6/6. For a gripper design similar to gripper 300, a desired fuse-out force $F_1$ was set at 5 lbs. Male and female dovetail heights were set to 4 mm and the overlap width between the dovetails was set to 1 mm. Male and female root widths were tested at different widths, but in each case were set equivalent to each other. It was determined through modeling and quantitative testing that a root width $W_1$ of 3 mm for both male and female root widths together resulted in the desired fuse-out force of 5 lbs and an acceptable safety factor $S_1$ of 1.2. Using less than the 3 mm determined root width $W_1$ would result in a lower fuse-out force and a higher safety factor. Correspondingly, using more than the 3 mm determined root width $W_1$ would result in a higher fuse-out force and a lower safety factor. Increasing overlap width (e.g., by changing the dovetail angle) can also increase fuse-out force and decrease the safety factor, and vice-versa. Similarly, modifying the root dovetail heights can also change the fuse-out force and safety factors.

Figure 9:
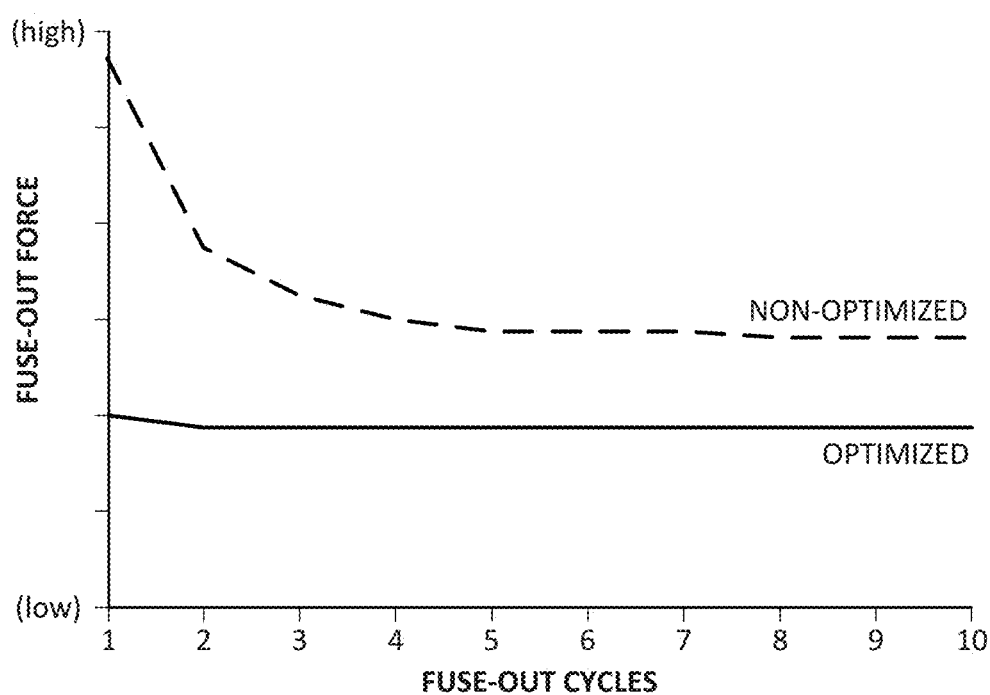
FIG. 9 is a chart illustrating Fuse-out Force versus Fuse-out Cycles, according to an example implementation.

Failing to maintain an adequate safety factor or an appropriate fuse-out force can result in plastic deformation of the retention mechanism, particularly during the first few fuse-out cycles. FIG. 9 is a chart illustrating fuse-out force versus fuse-out cycles, according to an example implementation. A non-optimized retention mechanism similar to retention mechanism 400 was tested for fuse-out force over repeated fuse-out (decoupling) cycles. The non-optimized retention mechanism was similarly sized in overall dimensions to retention mechanism 400, but without an inner channel opening at each of the male dovetail and with reference dimensions different than those described immediately above. The non-optimized retention mechanism exhibited continuing plastic deformation on the outer sides of the male dovetail after each of the four initial fuse-out cycles. As a result, the fuse-out force decreased dramatically over the initial fuse-out cycles before reaching a substantially steady-state value for the remaining fuse-out cycles, as illustrated by the dashed line in FIG. 9. Such variable fuse-out force is undesirable because it doesn't allow for consistent operating conditions and function, and prevents re-usability of a consistently performing retention mechanism. Also, plastic deformation from fuse-out may negatively affect reassembly. Consequently, a retention mechanism 400 configured with the reference dimensions determined above was tested. While the overall fuse-out force of retention mechanism 400 was lower, the fuse-out force was substantially consistent across all cycles, with only negligible reduction in fuse-out force after the first cycle, as illustrated by the solid line FIG. 9. Consequently, the retention mechanism 400, as tested, would be re-useable over many cycles because there is no significant degradation in performance characteristics.

Figure 10A:
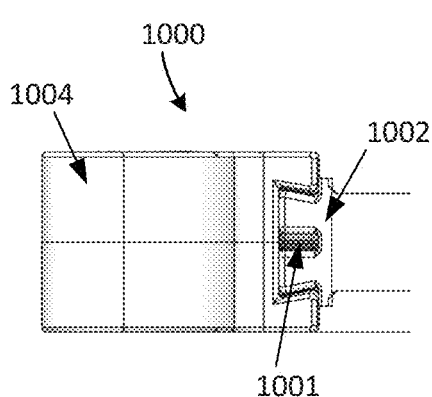
FIGS. 10A and 10B illustrate front and perspective views, respectively, of a retainer mechanism and insert, according to an example implementation.
Figure 10B:
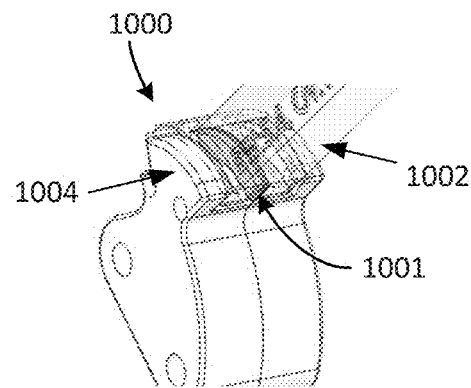
Figure 11:
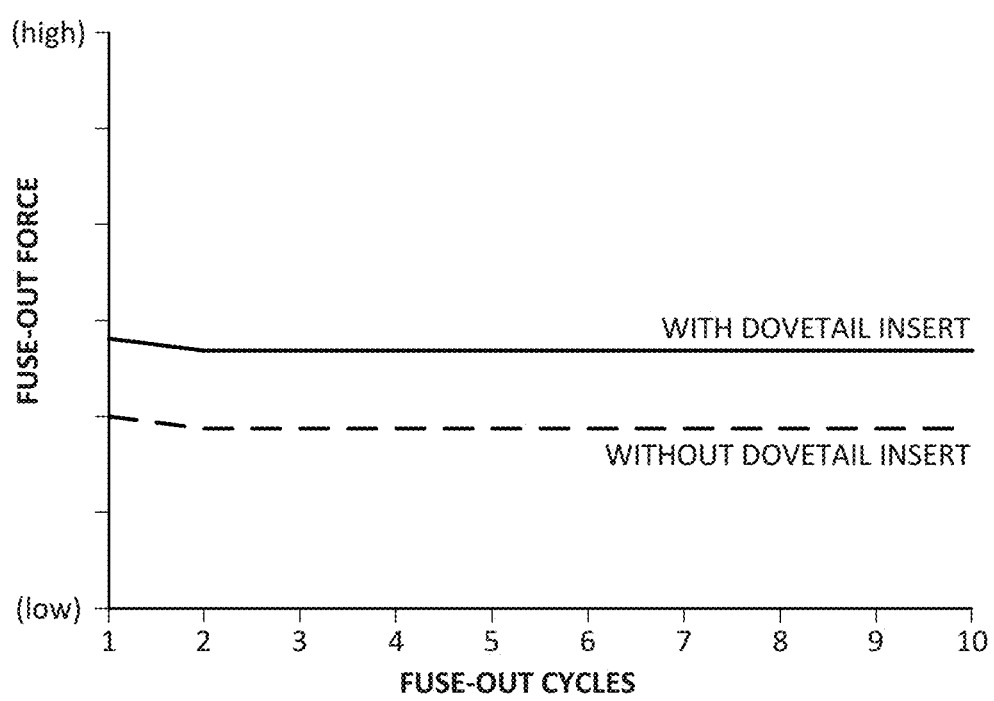
FIG. 11 is a chart illustrating Fuse-out Force versus Fuse-out Cycles, according to an example implementation.

In some cases it may be desirable to quickly adjust the fuse-out force of a retainer mechanism, such as mechanism 400. One manner of quickly tuning the fuse-out force is by adding an insert into the inner channel 426 of the male dovetail 408 to restrict the bending/deformation of the male dovetail during fuse-out decoupling. The insert can effectively increase fuse-out force, with harder or larger inserts resulting in relatively greater fuse-out force than softer or smaller inserts. FIGS. 10A and 10B illustrate front and perspective views, respectively, of a retainer mechanism 1000 and insert 1001, according to an example implementation. The retainer mechanism 1000 is similar to retainer mechanism 400 and includes first and second mounts 1002 and 1004, with respective revolved male and female dovetails, and an inner channel in the male dovetail. A shaped insert 1001 is provided in the inner channel to modify the fuse-out characteristics. In the embodiment shown, the insert 1001 is a segment of an annular ring and fills the inner channel. Other insert embodiments are also envisioned, including inserts with a different cross-sectional shape (e.g. trapezoidal), different heights, different widths, and/or different lengths. FIG. 11 is a chart illustrating fuse-out force versus fuse-out cycles, and compares identical retainer mechanisms with and without an insert, according to an example implementation. It can be seen that a retainer mechanism with an insert (solid line) will exhibit increased fuse-out force as compared to a retainer mechanism without an insert (dashed line).

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A robotic system comprising:
    a retainer mechanism comprising a first member and a second member, wherein the first member comprises a male dovetail structure, wherein the second member comprises a female dovetail structure, wherein the first member is coupled to the second member via the male and female dovetail structures;
    a first robotic appendage fixedly coupled to either the first or second member of the retainer mechanism; and
    a second robotic appendage fixedly coupled to the member not fixedly coupled to the first robotic appendage, and
    wherein at least a portion of the retainer mechanism is elastically deformable so to allow the first member to decouple from the second member without breaking via the male and female dovetail structures when a force applied to a side of the first robotic appendage is more than a threshold force.

2. The robotic system of claim 1, wherein the first robotic appendage comprises a finger.

3. The robotic system of claim 1, wherein the second robotic appendage comprises a finger.

4. The robotic system of claim 1, wherein the male dovetail structure comprises: (i) two outer surfaces inclined relative to each other, and (ii) an interior channel located between the two outer surfaces.

5. The robotic system of claim 4, wherein the male dovetail structure further comprises an insert located within the interior channel of the male dovetail structure.

6. The robotic system of claim 5, wherein the insert is arranged as a segment of an annular ring.

7. The robotic system of claim 1, wherein the retainer mechanism further comprises a detent configured to inhibit rotational movement of the first member relative to the second member.

8. The robotic system of claim 7, wherein the detent comprises:
    a recess; and
    a protrusion configured to mate with the recess.

9. The robotic system of claim 8, wherein the recess is arranged as a groove, and wherein the protrusion is arranged as a linear protrusion.

10. The robotic system of claim 1, wherein the male dovetail structure is arranged in an arc about a central axis.

11. The robotic system of claim 10, wherein the female dovetail structure is arranged in an arc about the central axis.

12. The robotic system of claim 1, wherein the female dovetail structure extends outward from the second member.

13. The robotic system of claim 1, wherein the retainer mechanism further comprises a backstop, wherein the backstop extends outward from the second member and is configured to mate with an end of the male dovetail and prevent rotational movement of the first member relative to the second member beyond the backstop.

14. The robotic system of claim 1, wherein the second member further comprises a base surface defining a side of a channel between two inner surfaces of the female dovetail structure, wherein the base surface is arranged, and
    wherein the male dovetail further comprises two bottom surfaces, wherein each bottom surface is oriented adjacent to and at an angle relative to a respective outer surface of the male dovetail structure, and wherein each of the respective bottom surfaces is configured to mate to the base surface of the second member.

* * * * *